Patented Jan. 1, 1929.

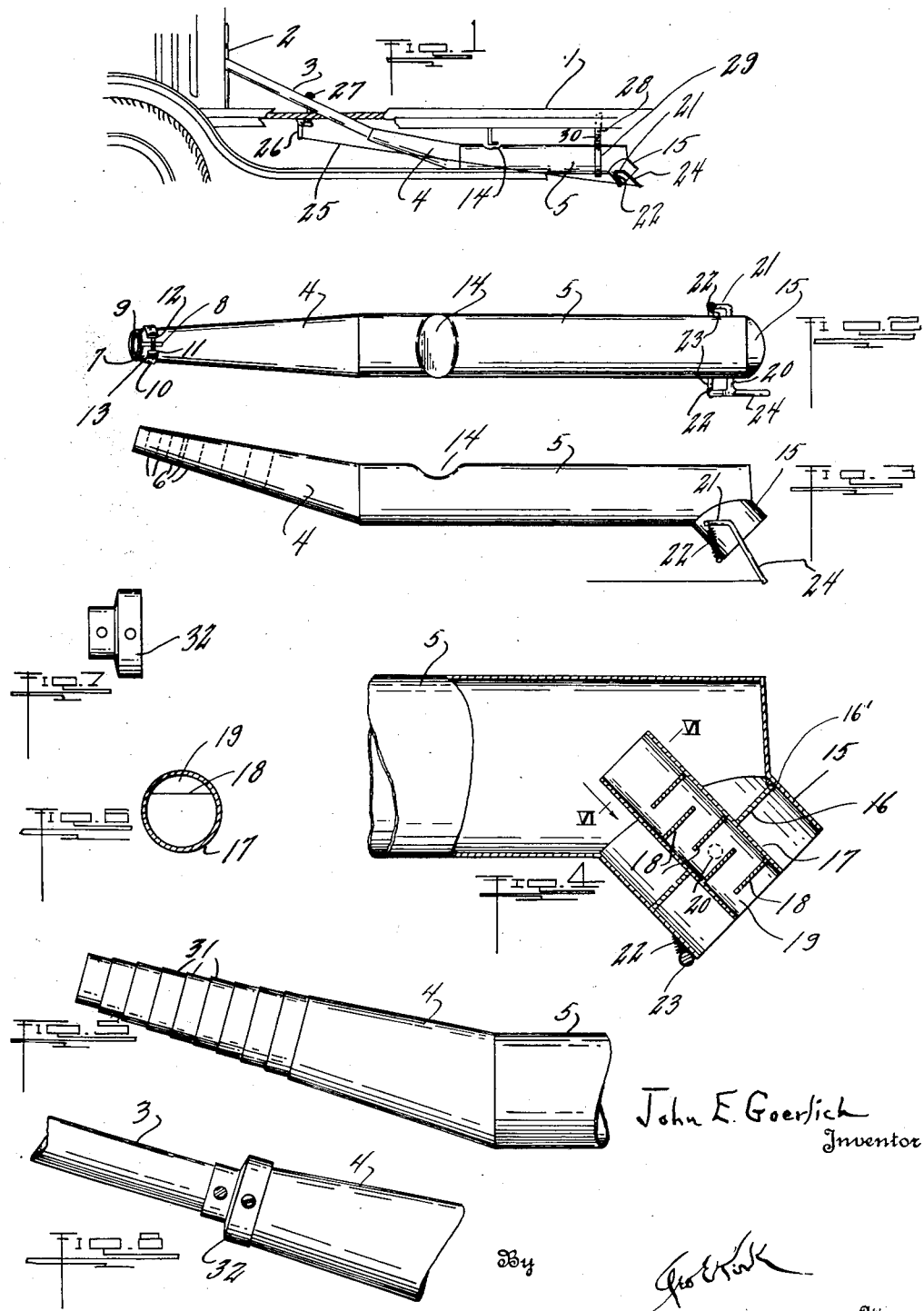

1,697,839

UNITED STATES PATENT OFFICE.

JOHN E. GOERLICH, OF TOLEDO, OHIO.

MUFFLER.

Application filed April 5, 1927. Serial No. 181,022.

This invention relates to exhaust devices for internal combustion motors.

This invention has utility when incorporated in devices which may be operated to avoid back pressure when used as a cut-out.

Referring to the drawings:

Fig. 1 is a fragmentary view of an embodiment of the invention in a motor vehicle;

Fig. 2 is a plan view of the device of Fig. 1;

Fig. 3 is a side elevation of the device of Fig. 2;

Fig. 4 is a detail view, on an enlarged scale, with parts broken away, of the discharge end of the device of Fig. 3;

Fig. 5 is a view on an enlarged scale of a different intake connection for the device of Fig. 3;

Fig. 6 is a section on the line VI—VI, Fig. 4;

Fig. 7 is a view of an additional type of adapter connection; and

Fig. 8 is a detail view showing adaptation of the connection to a motor exhaust pipe.

Motor vehicle 1 is shown as having an internal combustion motor 2 with exhaust pipe 3 leading therefrom. The device of this disclosure is shown as involving a tapered connection 4 of tubular form and angularly offset from a main expansion chamber 5. This tapered connection portion 4 is rigidly assembled with the expansion chamber 5 and is provided with fracture promoting indentations 6 enameled over to prevent air leakage or singing. The device retains sufficient rigidity for substantial unity in assembly and shipping. In practice, the diameter of the pipe 3 for the exhaust is taken as a desirable diameter for the connection 4 to be slipped thereover. This connection 4 may depart from true circular form to have oval contour 7 of greater diameter horizontally so that in approximating a horizontal position for the expansion chamber 5, this elliptical or oval opening 7 may be distorted for effective clamping about the exhaust pipe 3.

In practice this may be supplemented by slot 8 as a give for the terminal region of the connection 4 with asbestos packing 9 between the exhaust pipe 3 and the inner side of the connector 4 at the connection. In normal practice, this slot or weakening 8 may be omitted but where it may have rough usage and tight fitting is desired, the slot or weakening 8 may be used with clamping strip 10. This strip 10 is shown with offset ends 11, 12, to be connected by clamping bolt 13. For clearance from the under body braces for the chassis of the automobile 1 there may be depression 14 in expansion chamber 5 of this muffler. This muffler expansion chamber 5 remote from the connection 4 has offset extension 15 with diaphragm 16 as a full closure therefor. This diaphragm 16 is shown as having central tubular extension 17 mounted medially of its extent. This tubular member 17 has therein oppositely disposed fractional partitions 18 providing tortuous normally open way 19 through this tubular member 17. This renders the exhaust normally open from the expansion chamber 5.

In instances where it is desirable to use this device as a cut-out or for motor efficiency for even further reduction of what might be construed as a degree of back pressure upon the motor, this diaphragm 16 may be mounted on hinge pin 20 protruding from the sides of the extension 15 and having bearings in said extension with arms 21 as cranks extending therefrom to be engaged by tension springs 22 from cross pin 23. This position of these cranks 21, springs 22, and pin 23, serves normally to hold the partition 16 in closed position against lug 16'. Additional crank 24 rigid with the pin 20 has connection 25 therefrom to angle lever 26 operable by tread 27 adjacent the position of the operator of the car 1, so that by depressing such tread 27 the diaphragm 16 may be shifted as a valve into open position, thereby serving as a cut-out.

In the mounting of this device for motor vehicles, angle bracket 28 fixed with the chassis of the car 1 has depending flexible strap 29 to wrap about the cylindrical expansion chamber 5 and, by means of bolt 30, serves as a clamp for positively anchoring this device in position with the extension 15 directed downwardly toward the road.

Instead of the indentations 6 as shown for the connector 4 there may be provided ledges or shoulders 31 on this connector 4 which may be severed at a desired shoulder region for proper fitting connection with the exhaust pipe 3 of the selected assembly.

In the event the angularly offset connector or tapered extension 4 or mounting for the chamber 5 be short in the desired mounting there may be provided reducer coupling 32 for the desired diameter reduction between the muffler and the pipe 3.

What is claimed and it is desired to secure by Letters Patent is:

1. A muffler housing having an expansion chamber, an outlet from said housing and an inlet to said housing gradually merging from the housing in its extent along and away from the line of direction of the upper side of the housing, said inlet being of variable effective diameter and of tubular form substantial as exposed to exhaust gas temperature from an internal combustion motor, and assembly coacting means effective between the inlet and the exhaust pipe of the motor for anchored mounting connection therebetween.

2. A muffler housing having an expansion chamber, an outlet from said housing and an inlet to said housing, said inlet being of tubular form tapering to smaller variable effective diameters by gradually merging from the housing in its extent along and away from the line of direction of the upper side of the housing and substantial as exposed to exhaust gas temperature from an internal combustion motor, said tapering tubular inlet being adapted for effective assembly coaction with the exhaust pipe of a motor for maintained connection therebetween.

3. A muffler housing having an expansion chamber, an outlet from said housing and an inlet to said housing, said inlet being of tubular form tapering to a plurality of successively definitely separated smaller variable effective diameters gradually merging from the housing in its extent away from and along the line of direction of said housing and substantial as exposed to exhaust gas temperature from an internal combustion motor, said tapering tubular inlet being adapted for effective assembly coaction with the exhaust pipe of a motor for maintained connection therebetween.

4. A muffler housing having an expansion chamber, an outlet from said housing and an inlet to said housing, said inlet being of tubular form tapering to smaller variable effective diameters gradually merging from the housing in its extent away from and along the line of direction of the housing and substantial as exposed to exhaust gas temperature from an internal combustion motor, and a clamp mounting ring for effecting anchored assembly between the inlet and a motor exhaust pipe.

5. A muffler housing having an expansion chamber, an outlet from said housing and an inlet to said housing gradually merging from the housing, said inlet being of tubular form tapering to smaller variable effective diameter at an angle upward from the upper side of the housing in its extent away from and along the axis of the housing and substantial as exposed to exhaust gas temperature from an internal combustion motor, said tapering tubular inlet being adapted for effective assembly with the exhaust pipe of a motor for maintained connection therebetween.

6. An exhaust expansion chamber having within an extension thereof a movable diaphragm terminus, a labyrinth outlet carried by said terminus, and means for shifting said terminus on an axis transversely through the chamber extension to cause the terminus to act as a cut-out valve.

7. An exhaust expansion cylindrical chamber, a butterfly valve closure for a terminus of the chamber, and a normally open labyrinth outlet from the chamber through said valve with said valve in closed position.

8. A silencer comprising a cylindrical exhaust expansion chamber, a butterfly valve closure for a terminus of the chamber, and a labyrinth outlet mounted on said valve centrally of the valve.

In witness whereof I affix my signature.

JOHN E. GOERLICH.